United States Patent
Takemoto (10) Patent No.: US 9,669,479 B2
(45) Date of Patent: Jun. 6, 2017

(54) DATA COLLECTION SYSTEM FOR ELECTRIC DISCHARGE MACHINES

(71) Applicant: FANUC CORPORATION, Minamitsuru-gun, Yamanashi (JP)

(72) Inventor: Masanobu Takemoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 422 days.

(21) Appl. No.: 14/029,282

(22) Filed: Sep. 17, 2013

(65) Prior Publication Data

US 2014/0076855 A1    Mar. 20, 2014

(30) Foreign Application Priority Data

Sep. 18, 2012   (JP) .................................. 2012-204561

(51) Int. Cl.
   *B23H 1/02*      (2006.01)
   *G05B 19/406*    (2006.01)

(52) U.S. Cl.
   CPC ............ *B23H 1/02* (2013.01); *G05B 19/406* (2013.01); *G05B 2219/45221* (2013.01)

(58) Field of Classification Search
   CPC . B23H 1/02; B23H 1/028; B23H 7/20; G05B 19/406; G05B 2219/45221
   See application file for complete search history.

(56) References Cited

U.S. PATENT DOCUMENTS

| 6,549,824 B1* | 4/2003 | Satou et al. ................. 700/162 |
| 6,610,956 B1 | 8/2003 | Yasuda |
| 2001/0027353 A1* | 10/2001 | Kwak .......................... 700/138 |
| 2004/0267395 A1* | 12/2004 | Discenzo et al. ............... 700/99 |
| 2007/0143038 A1* | 6/2007 | Yuan et al. ..................... 702/35 |
| 2010/0145484 A1* | 6/2010 | Yang et al. ..................... 700/83 |
| 2013/0238103 A1* | 9/2013 | Takemoto ....................... 700/83 |

FOREIGN PATENT DOCUMENTS

| CN | 2726796 Y | 9/2005 |
| CN | 101791730 A | 8/2010 |
| DE | 102009027267 A1 * | 12/2010 |
| JP | 60-242917 A * | 12/1985 |
| JP | 1289624 A | 11/1989 |

(Continued)

OTHER PUBLICATIONS

Machine translation of Japan Patent document No. 2000-334,187, Apr. 2015.*

(Continued)

*Primary Examiner* — Geoffrey S Evans
(74) *Attorney, Agent, or Firm* — Hauptman Ham, LLP (57) ABSTRACT

In a data collection system for electric discharge machines, multiple electric discharge machines are connected with a computer over a data transmission path. Information on machining conditions of an electric discharge machine is stored in a storage unit of the electric discharge machine, and information sent from the electric discharge machine after completion of machining is collected by the computer. By minimizing monitoring information that is temporarily stored in the storage unit, various kinds of monitoring information can be stored without being affected by a network environment.

5 Claims, 6 Drawing Sheets

(56) References Cited

FOREIGN PATENT DOCUMENTS

| | | | | |
|---|---|---|---|---|
| JP | 2000-334187 | A | * | 12/2000 |
| JP | 2001269822 | A | | 10/2001 |
| JP | 2007-004601 | A | * | 1/2007 |
| JP | 20074601 | A | | 1/2007 |
| JP | 2007-307661 | A | * | 11/2007 |
| JP | 4047544 | B2 | | 11/2007 |
| JP | 4137384 | B2 | | 6/2008 |
| JP | 2008-296314 | A | * | 12/2008 |
| JP | 2008296314 | A | | 12/2008 |

OTHER PUBLICATIONS

Machine translation of Japan Patent document No. 2007-004,601, Apr. 2015.*

Machine tranlsation of Japan Patent document No. 2008-296,314, Apr. 2015.*

Machine translation of Japan Patent document No. 2007-307,661, Apr. 2015.*

Office Action issued Mar. 25, 2015, corresponding to Chinese patent application No. 201310421173.6.

Office Action mailed Jul. 15, 2014, corresponding to Japanese patent application No. 2012-204561.

* cited by examiner

| ASSESSMENT RESULT | ITEM TO BE STORED |
|---|---|
| NON-DEFECTIVE | NONE |
| INSPECTION REQUIRED | SIMPLE DATA INDICATING NECESSITY OF INSPECTION (e.g., VALUE OF PHYSICAL QUANTITY ASSESSED AS INSPECTION REQUIRED) |
| DEFECTIVE | STORE MACHINING VOLTAGE AND OTHER INFORMATION SUCH AS MACHINING CURRENT |

FIG.6

| ASSESSMENT RESULT | ITEM TO BE STORED |
|---|---|
| NON-DEFECTIVE | NONE |
| INSPECTION REQUIRED | FLAG VALUE INDICATING NECESSITY OF INSPECTION |
| DEFECTIVE | STORE MACHINING VOLTAGE AND OTHER INFORMATION SUCH AS MACHINING CURRENT |

DATA COLLECTION SYSTEM FOR ELECTRIC DISCHARGE MACHINES

RELATED APPLICATIONS

The present application is based on, and claims priority from, Japanese Application Number 2012-204561, filed, the disclosure of which is hereby incorporated by reference herein in its entirety.

BACKGROUND OF THE INVENTION

1. Field of the Invention

The present invention relates to a data collection system for electric discharge machines in which a computer is connected with electric discharge machines over a network.

2. Description of the Related Art

A known technique for assessing the quality of a machined product manufactured by machining with an electric discharge machine is to measure and assess the surface roughness or dimensional accuracy of the machined product after machining. However, general assessing method of the quality of a machined product is to obtain monitoring information, such as machining voltage, machining current and machining speed which are used for keeping track of machining conditions during machining, and to asses the obtained monitoring information by determining the monitoring information falls within a prescribed range or not. And such obtained monitoring information is stored in a storage device in a numerical controller mounted on the electric discharge machine or transferred to a computer over a network when the electric discharge machine is connected to a network.

Japanese Patent No. 4137384 (JP4137384B2) discloses a technique for collecting data on machining speed, machining voltage, machining current, on-time and off-time of voltage applied to electrodes, total number of discharges, the number of abnormal discharges, abnormal discharge rate and discharge frequency during machining with an electric discharge machine, and storing the collected data in a numerical controller mounted on the electric discharge machine.

Such a numerical controller mounted on an electric discharge machine, however, typically has a smaller data storage capacity than a personal computer or a server. This makes it difficult to store multiple kinds of monitoring information over all routes of electric discharge machining that takes a long machining time in terms of storage capacity. Also, mounting a large-capacity storage device on an electric discharge machine for storing various kinds of monitoring information increases costs of the electric discharge machine.

Another known technique is to continuously transfer various kinds of monitoring information to a network-connected computer and store the information in a storage device in the computer, instead of storing them in the numerical controller mounted on the electric discharge machine. While this scheme avoids the problem of increase in costs of the electric discharge machine caused by mounting a large-capacity storage on the electric discharge machine as in the case of the above-mentioned patent document, constant transfer of data over a network can increase communication load on the network or result in monitoring information not being stored in the computer in the event of a failure on the network.

Japanese Patent No. 4047544 (JP4047544B2) discloses a system for collecting monitoring information such as variations in machining voltage and/or machining speed during machining via a network connection between a computer and an electric discharge machine.

The system, constituted by a computer and an electric discharge machine, is able to store monitoring information such as machining speed, machining voltage, and machining current during a machining process in the numerical controller in the electric discharge machine at predetermined time intervals and subsequently transmit the information to an external computer or the like as needed. This scheme, however, has the disadvantage of data volume becoming large because it stores monitoring information at predetermined time intervals.

SUMMARY OF THE INVENTION

The present invention addresses the above problems of the prior art technique with the object of providing a data collection system for electric discharge machines that is capable of collecting and storing various kinds of monitoring information during machining without adding a large-capacity storage device to a numerical controller mounted on the electric discharge machine.

In a data collection system for electric discharge machines according to the present invention, a computer is connected with electric discharge machines over a data transmission path, information on machining conditions of an electric discharge machine is stored in a storage unit of the electric discharge machine, and information sent from the electric discharge machine after completion of machining is collected by the computer. The electric discharge machine includes: a detection unit that detects a physical quantity relating to machining conditions during machining either at predetermined intervals or each time a moving part of the electric discharge machine has traveled a predetermined distance; a determination unit that determines whether the physical quantity detected by the detection unit exceeds a predetermined threshold or not; a storage unit that stores the physical quantity or information indicating the fact that the physical quantity exceeds the threshold when the determination unit determines that the detected physical quantity exceeds the predefined threshold; and a transmission unit that sends the physical quantity or the information indicating the fact that the physical quantity exceeds the threshold, stored in the storage unit, after the machining by the electric discharge machine. The computer includes: a reception unit that receives the physical quantity or the information indicating the fact that the physical quantity exceeds the threshold sent from the transmission unit after the machining by the electric discharge machine; and a storage unit that stores the physical quantity or the information indicating the fact that the physical quantity exceeds the threshold, received by the reception unit.

According to the data collection system for electric discharge machines of the present invention, electric discharge machines do not store all physical quantities that relate to machining conditions during machining but store them only when any physical quantity goes beyond a predetermined range. This minimizes monitoring information to be stored in the storage units of electric discharge machines and enables storage of necessary monitoring information even for electric discharge machining that involves a long machining time. In addition, since physical quantities stored in the storage units of electric discharge machines are sent to the computer after completion of machining instead of being transferred over the network at all times, no problem would occur in information transmission if communication load on the network becomes high or a temporary trouble occurs on the network.

Note that the language "cross a threshold" used herein is intended to mean a transition from a range defined as "non-defective products" to another range defined as "defective products" in case where a range representing "non-defective products" and a range representing "defective products" are demarcated by a threshold, and is not necessarily used only to mean a transition from the smaller-valued range to the larger-valued range across the threshold.

The the physical quantity may include one of: a machining voltage, a machining current, a machining speed, a temperature of a place where the electric discharge machine is installed, and a water temperature in a machining tank.

The threshold may be a range defined by an upper limit and a lower limit of the physical quantity, and a plurality of such ranges are set for the physical quantity to be determined by the determination unit. The electric discharge machine may further include a setting unit that sets one or more items of physical quantities to be stored, from among the physical quantity to be determined by the determination unit and other physical quantities relating to the machining conditions, according to the respective ranges. The determination unit determines one of the set ranges within which the detected physical quantity falls. And the storage unit stores the item of physical quantity, set by the setting unit according to the respective ranges, based on the determination result of the determination unit.

According to this embodiment, physical quantities to be stored in the storage device of an electric discharge machine are minimized by varying the kinds of physical quantity to be stored in the storage device of the electric discharge machine in accordance with which range a physical quantity is determined to fall within. Thus, various kinds of monitoring information can be stored for a long machining time even in a numerical controller not having a large-capacity storage device.

The threshold may be a range defined by an upper limit and a lower limit of the physical quantity, and a plurality of such ranges are set for the physical quantity to be determined by the determination unit. The electric discharge machine may further include a setting unit that selects, for each of the set ranges, one of: a storage mode that stores the physical quantity in a form of a measured value and another storage mode that stores the physical quantity in the form of a flag indicating whether the physical quantity falls within or outside the range. The determination unit determines one of the set ranges within which the detected physical quantity falls. And the storage unit stores the physical quantity in the storage mode selected by the setting unit, based on the determination result of the determination unit.

According to this embodiment, a physical quantity is stored in the storage device of an electric discharge machine in different forms, i.e., either as a flag or a measured value, depending on which range the physical quantity is determined to fall within, thereby minimizing physical quantities to be stored in the storage device. Thus, various kinds of monitoring information can be stored for a long machining time even in a numerical controller not having a large-capacity storage device.

If the physical quantity or the information indicating that the physical quantity exceeds the threshold, stored in the storage unit of the electric discharge machine, exceeds a predetermined size, the physical quantity or the information indicating that the physical quantity exceeds the threshold may be sent from the electric discharge machine to the computer, and the machining by the electric discharge machine is stopped.

According to this embodiment, when the physical quantity or data exceeds a predetermined size, the physical quantity or data is sent from the electric discharge machine to the computer and operation of the electric discharge machine is stopped, thereby preventing an overflow of monitoring information that should be stored and a resulting failure to store them. It also can prevent machining from continuing with the physical quantity or data exceeding a predetermined size so that the product in process is not judged as defective and does not result in waste machining if the machining is continued in such a condition. Additionally, since the physical quantity or data in the electric discharge machine is sent to the computer upon exceeding the predetermined size, the physical quantity or data sent to the computer may be analyzed to determine the cause of the defectiveness and the like.

According to the present invention, by minimizing the amount of monitoring information temporarily stored in a numerical controller mounted on an electric discharge machine, various kinds of monitoring information can be stored without being affected by a network environment even if the numerical controller does not have a large-capacity storage device. Further, transfer of such monitoring information temporarily stored in the numerical controller to a computer connected over a network enables storage of a large volume of monitoring information.

BRIEF DESCRIPTION OF THE DRAWINGS

These and other objects and features of the present invention will become apparent from the following description of an exemplary embodiment with reference to the accompanying drawings in which.

DETAILED DESCRIPTION OF THE PREFERRED EMBODIMENTS

Figure 1:
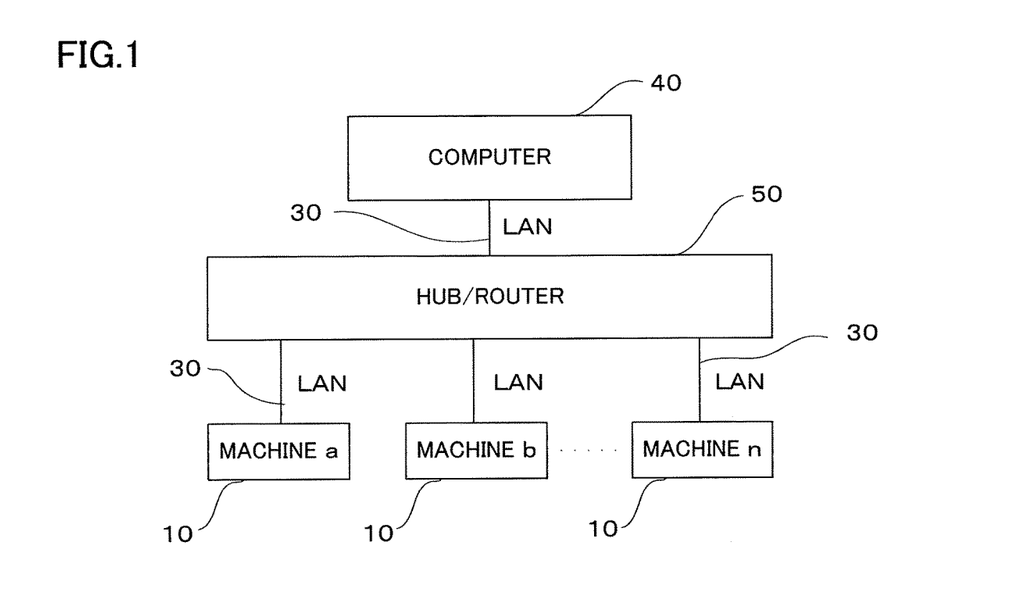
FIG. 1 schematically shows a data collection system for electric discharge machines according to the present invention.

Referring to FIG. 1, a data collection system for electric discharge machines 10 according to the present invention will be generally described first.

Multiple electric discharge machines 10 (machines a, b, ..., n) are connected with a computer 40 via a hub and router 50. Between the computer 40 and the hub/router 50, and between the hub/router 50 and each of machines a, b, ..., and n are connected by LANs 30. While between the computer 40 and the hub/router 50, and between the hub/router 50 and the individual machines are connected by LANs 30 in the example of FIG. 1, they may be connected by network connection means other than LANs.

Figure 2:
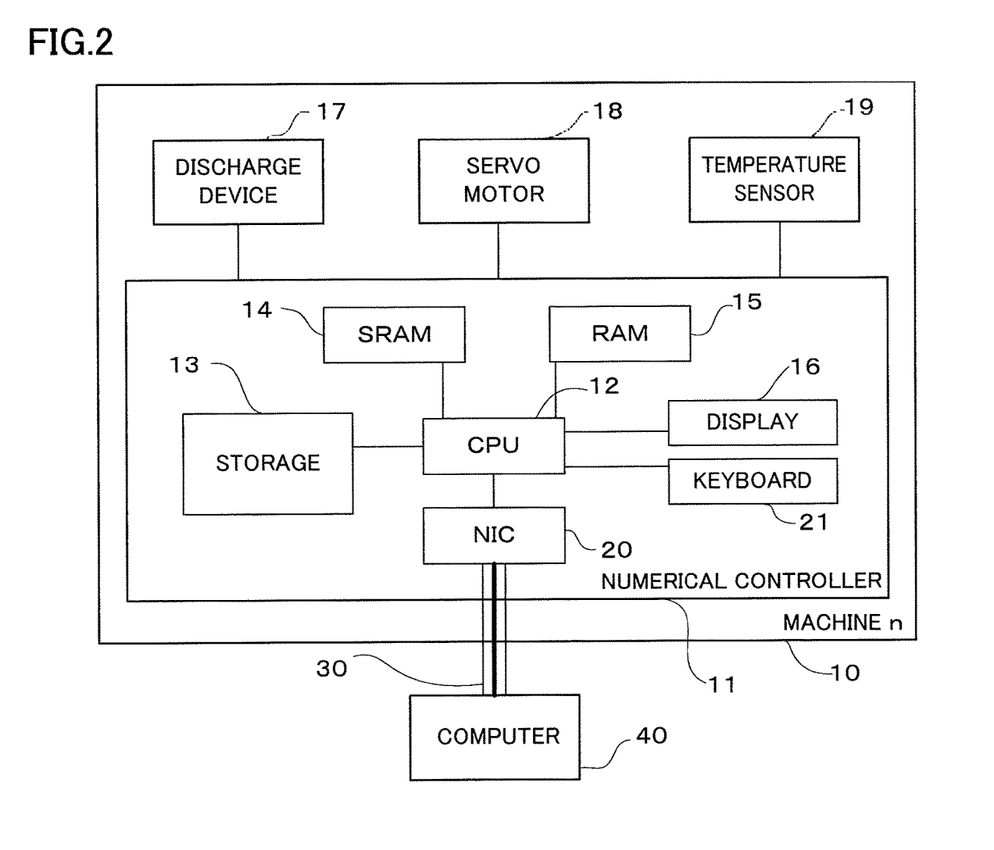
FIG. 2 schematically shows a numerical controller which is mounted on an electric discharge machine and which constitutes the data collection system of FIG. 1.

Turning to FIG. 2, a numerical controller 11 included in each electric discharge machine 10 (machine n) is described.

As also shown in FIG. 1, the electric discharge machine 10 (machine n) is connected with the computer 40 by a LAN and includes a numerical controller 11, a discharge device 17, a servo motor 18, and a temperature sensor 19. The numerical controller 11 includes a CPU 12, a storage 13, an SRAM 14, a RAM 15, a display 16, a keyboard 21, and a network interface card (NIC) 20.

The storage 13 is a flash memory or a hard disk for example, and the SRAM 14 is a nonvolatile memory backed by a battery or the like. The storage 13 and SRAM 14 store setting data, machining conditions, and machining programs for use in machining, and thresholds for use in performing assessment of monitoring information.

The display 16 shows monitoring information and other information. The keyboard 21 is used for inputting a monitoring range (an assessment range used for storage of data in the numerical controller 11 as described later) or inputting types of data to be stored in the numerical controller 11 when any monitoring information goes beyond the monitoring range. Although, in the example of FIG. 2, monitoring range and data types for storage are manually input using the keyboard 21 with which the numerical controller 11 is equipped, they may instead be set from a network-connected computer or may be input using a machining program.

Various setting data, machining conditions, machining programs, and stored monitoring information used for assessing the quality of machined products can be obtained by the numerical controller 11 and sent from the numerical controller 11 to the computer 40, which is connected via the NIC 20 and LAN 30, to be stored in the computer 40. While in this embodiment the connection between the machine 10 and the computer 40 is a LAN connection as described above with reference to FIG. 1, other network connection means may instead be used for the connection.

In the data collection system for the electric discharge machine 10, the numerical controller 11 periodically obtains physical quantities such as machining voltage and machining current, and performs assessment of machined product quality for each kind of physical quantity obtained. For the data collection system for the electric discharge machine 10, FIG. 3 shows the relationship between machining voltage values of the electric discharge machine 10 and assessment of machined product quality; and FIG. 4 shows the relationship between machining current values and assessment of machined product quality.

Figure 3:
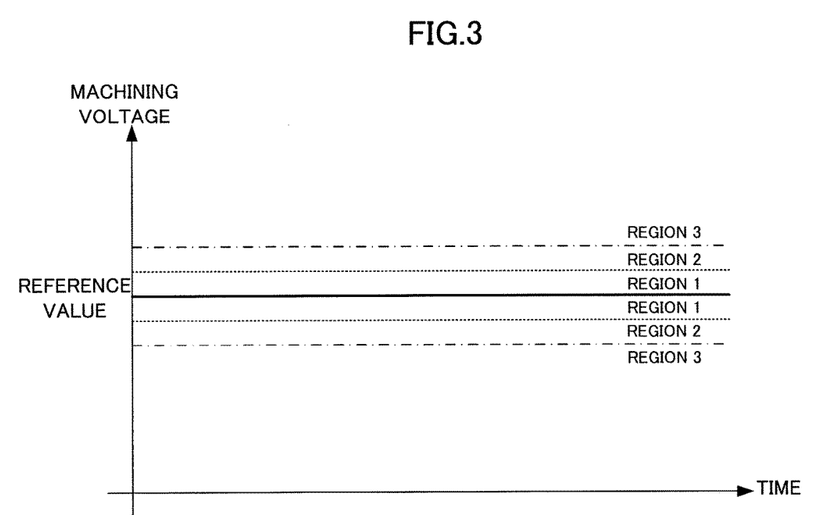
FIG. 3 shows an example of machining voltage values and assessment of machined product quality in the data collection system for electric discharge machines according to the present invention.
Figure 4:
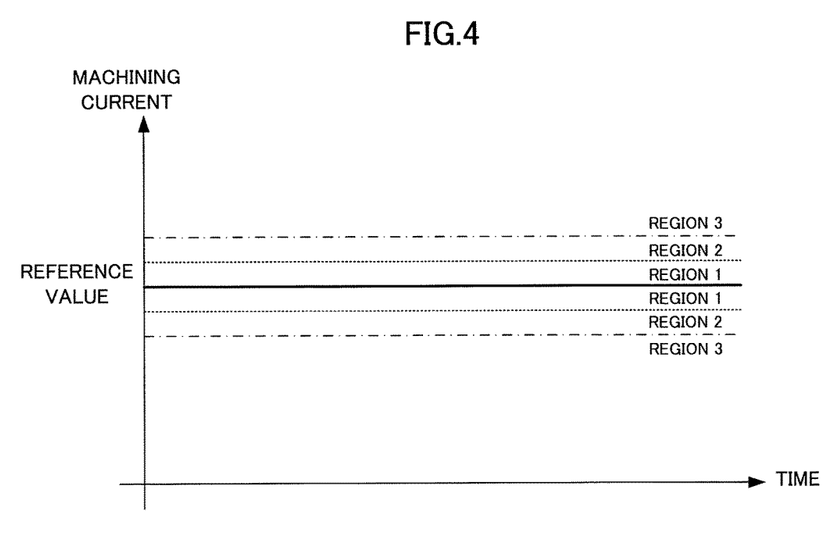
FIG. 4 shows an example of machining current values and assessment of machined product quality in the data collection system for electric discharge machines according to the present invention.

In FIG. 3, the bold solid line denotes a reference value representing a voltage optimal as machining voltage. When the machining voltage falls within "region 1" between the bold solid line and the broken line, representing a predetermined range around the reference value, the machining voltage is assessed as "non-defective products (no inspection required)". When the machining voltage is in "region 2" between the broken line and the chain line, the machining voltage is assessed as "inspection required". When the machining voltage is in "region 3" outside the chain line, the machining voltage is assessed as "defective products". The assessment focuses on whether the machining voltage falls within either region 2 or 3, which are outside the broken line; when the machining voltage falls within region 1 and is assessed as "non-defective products (no inspection required)", physical quantity values at the time are not stored. When the machining voltage falls within region 2 and is assessed as "inspection required", only simple data enough to indicate the necessity of inspection is stored, rather than storing many kinds of data. When the machining voltage falls within region 3 and is assessed as "defective products", the machining voltage as well as other data are stored in order to determine the cause of the defectiveness.

More specifically, when the machining voltage falls within region 2 and is assessed as "inspection required", only the machining voltage value obtained by monitoring is stored or a flag value indicating that the result of assessment was region 2 is stored. When the machining voltage falls within region 3 and is assessed as "defective products", the machining current, machining speed, the current positions of axes and the like at the time are also stored in addition to the machining voltage value obtained by monitoring.

Figure 5:
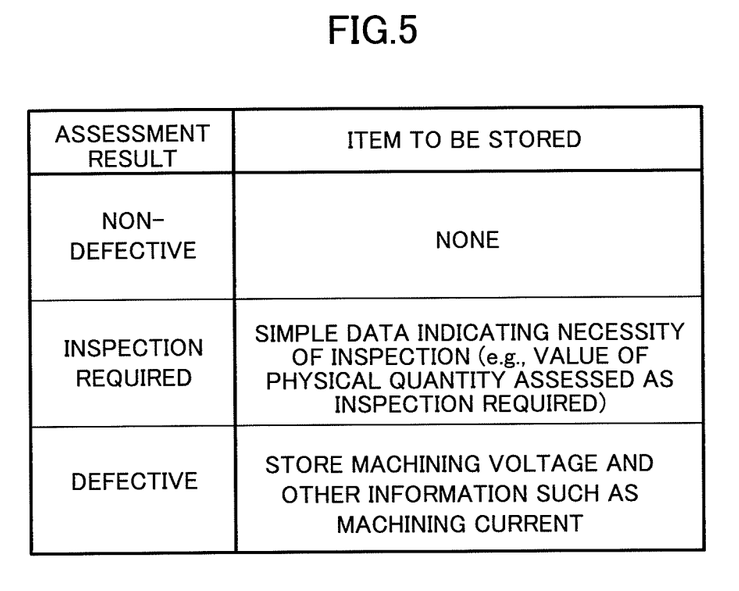
FIG. 5 shows the relationship between the result of machining voltage assessment and data to be stored in response to the result, where only a machining voltage value obtained by monitoring is stored when the result of assessment is "inspection required"
Figure 6:
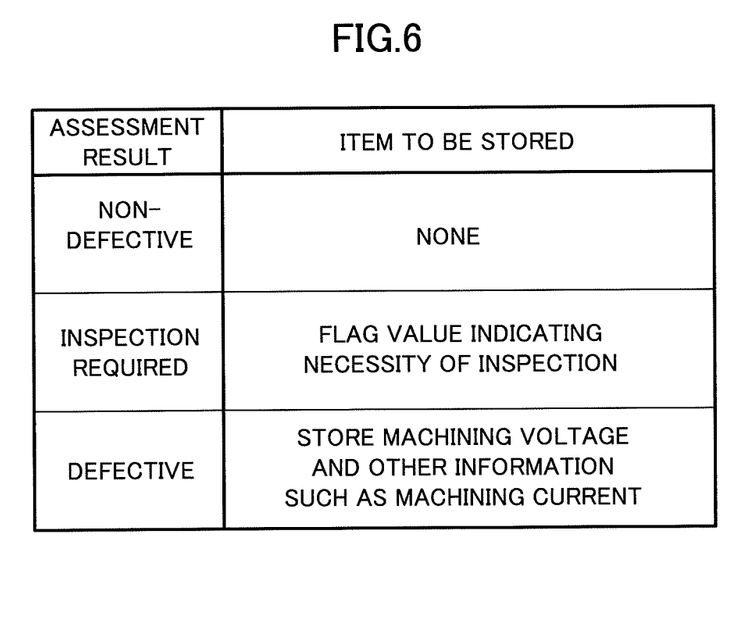
FIG. 6 shows the relationship between the result of machining voltage assessment and data to be stored in response to the result, where a flag value indicating the assessment result is stored when the result is "inspection required"

FIGS. 5 and 6 show the relationship between the result of assessment on machining voltage and data to be stored in response to the result. In FIG. 5, only the machining voltage value obtained by monitoring is stored when the assessment result is "inspection required"; while in FIG. 6 a flag value indicating the assessment result is stored when the result is "inspection required".

In addition to measuring the machining voltage of the electric discharge machine 10 and assessing machined product quality based on the measured value (FIG. 3), measuring of the machining current of the electric discharge machine 10 and assessing machined product quality based on the measured value (FIG. 4) is also concurrently performed in a similar manner.

When the machining current falls within region 1 shown in FIG. 4 and is assessed as "non-defective products (no inspection required)", physical quantity values at the time are not stored. When the machining current falls within region 2 shown in FIG. 4 and is assessed as "inspection required", only simple data enough to indicate the necessity of inspection is stored, rather than storing many kinds of data. When the machining current falls within region 3 shown in FIG. 4 and is assessed as "defective products", the machining current as well as other data are stored in order to determine the cause of the defectiveness.

More specifically, when the machining current falls within region 2 and is assessed as "inspection required", only the machining current value obtained by monitoring is stored or a flag value indicating that the result of assessment was region 2 is stored. To make clear which physical quantity was assessed as "inspection required", the value of the physical quantity that was assessed as inspection required may be stored or different flags may be prepared for the kinds of physical quantities that were assessed as inspection required. When the machining current falls within region 3 and is assessed as "defective products", machining voltage, machining speed, the current positions of axes and the like at the time are also stored in addition to the machining current value obtained by monitoring.

Using the flowchart of FIG. 7, the process of storing only simple data when the result of machining voltage assessment is "inspection required" will be described per step.

Step SA1: Whether machining has started or not is determined. If machining has started, the flow proceeds to step SA2.

Step SA2: Stored monitoring information that has been stored during previous monitoring is cleared.

Step SA3: Monitoring information such as machining voltage and machining current is acquired.

Step SA4: Whether or not data in the acquired monitoring information falls within a predefined range of "non-defective products" is determined. If the data is within the range of "non-defective products" (Yes), the flow proceeds to step SA9. If the data is outside the range of "non-defective products" (No), the flow proceeds to step SA5.

Step SA5: Whether or not data in the monitoring information acquired in step SA3 falls within a predefined range of "inspection required" is determined. If the data is within the range of "inspection required" (Yes), the flow proceeds to step SA7. If the data is outside the range of "inspection required" (No), the flow proceeds to step SA6.

Step SA6: The acquired data is determined to be "defective products", and the machining voltage as well as the machining current, machining speed, and/or the current positions of axes at the time are stored in the numerical controller 11 as monitoring information.

Step SA7: Only simple data indicative of "inspection required" (e.g., only the values of the physical quantities that were assessed as "inspection required") are stored in the numerical controller 11.

Step SA8: Whether or not the data stored in the numerical controller 11 has exceeded the storage capacity is determined. If the storage capacity has not been exceeded (No), the flow proceeds to step SA9. If the storage capacity has been exceeded (Yes), the flow proceeds to step SA11.

Step SA9: Whether machining by the electric discharge machine has completed is determined. If machining has completed (Yes), the flow proceeds to step SA10. If machining has not completed yet, the flow returns to step SA3 to continue monitoring.

Step SA10: In response to completion of machining, monitoring information stored in the numerical controller 11, such as machining voltage, machining current, machining speed, the current positions of axes, are sent to the computer 40 from the numerical controller 11, whereupon the process ends.

Step SA11: As the data storage capacity of the numerical controller 11 has been reached, monitoring information stored in the numerical controller 11, such as machining voltage, machining current, machining speed, the current positions of axes, are sent to the computer 40 from the numerical controller 11.

Step SA12: An alarm indicating that data in the numerical controller 11 goes beyond the storage capacity is displayed on the display 16 of the numerical controller 11, the machining operation of the electric discharge machine is stopped, and the process is terminated.

Figure 8:
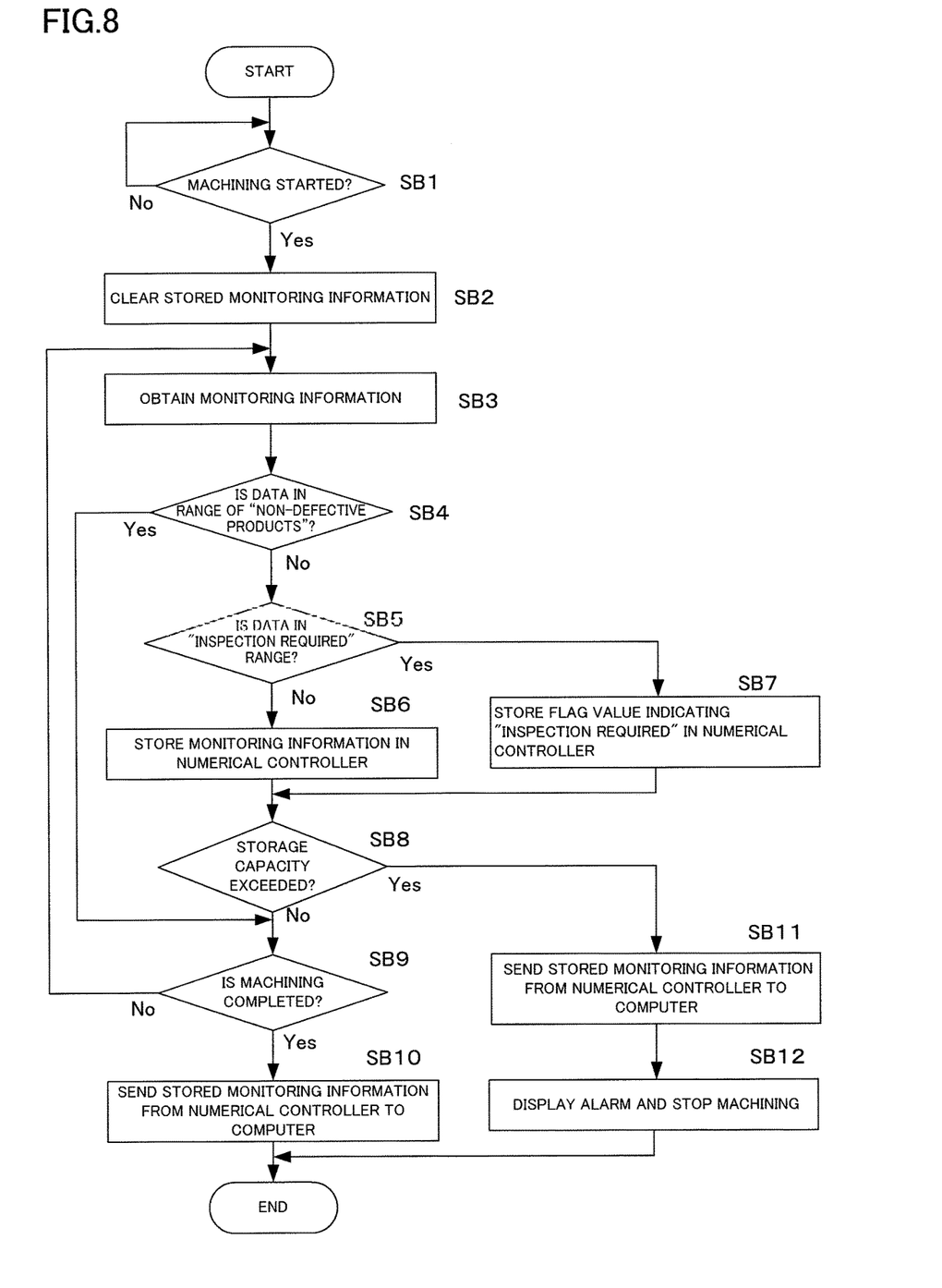
FIG. 8 is a flowchart illustrating a process of storing a flag when the result of machining voltage assessment is "inspection required"

FIG. 8 is a flowchart illustrating the process of storing a flag value indicative of the assessment result when the result of machining voltage assessment is "inspection required".

Figure 7:
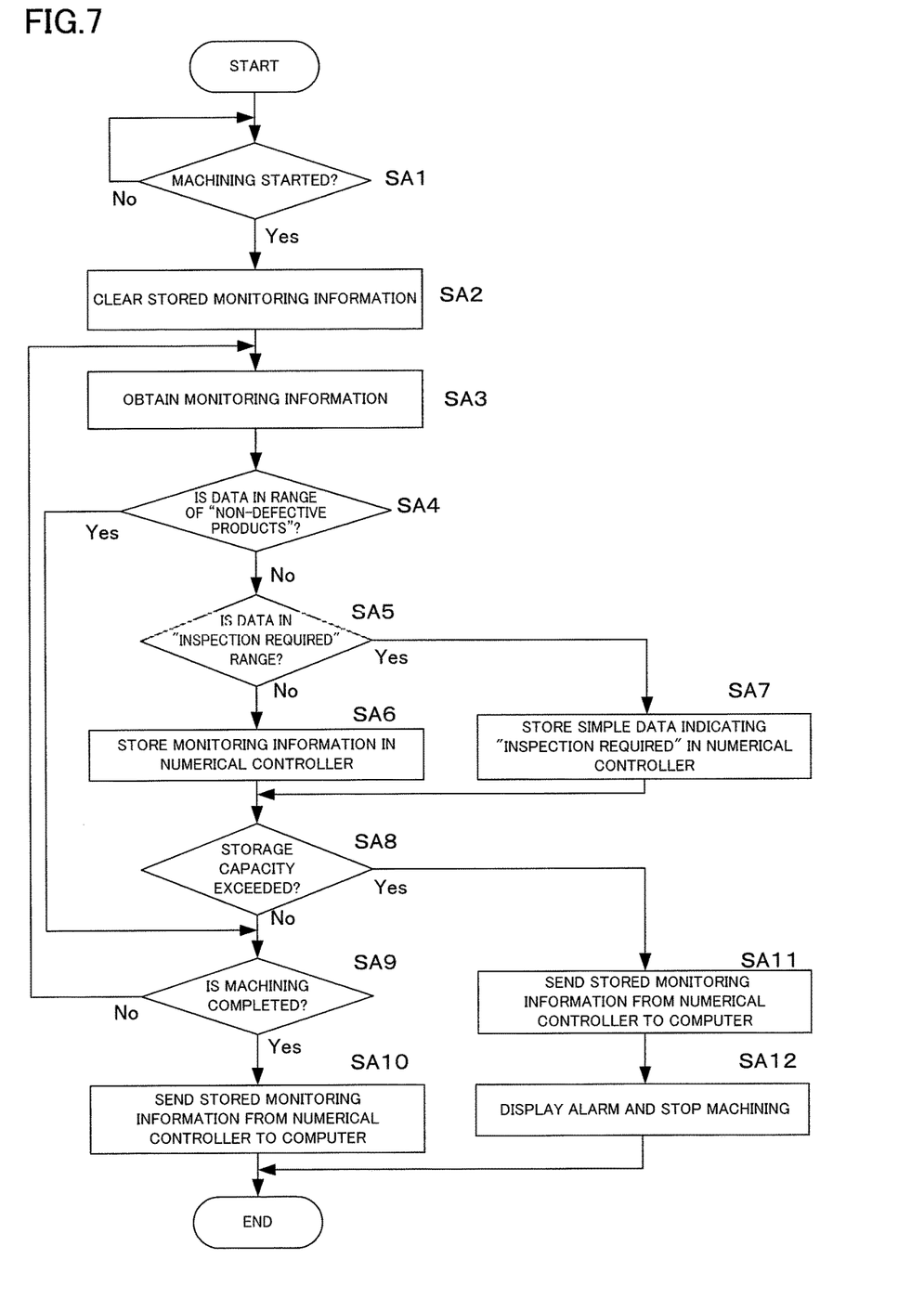
FIG. 7 is a flowchart illustrating a process of storing simple data when the result of machining voltage assessment is "inspection required"

While processing in steps SB1 through SB12 shown in the flowchart of FIG. 8 is substantially the same as processing in steps SA1 through SA12 in the flowchart of FIG. 7, the processing in step SB7 in FIG. 8 is different from the processing in step SA7 of FIG. 7. Specifically, in FIG. 7, when data is determined to fall within a range of "inspection required" in step SA5 and then the flow proceeds to step SA7, only simple data indicative of "inspection required" (e.g., only the values of the physical quantity that were assessed as "inspection required") is stored in the numerical controller 11; whereas in FIG. 8, when data is determined to fall within a range of "inspection required" in step SB4 and then the flow proceeds to step SB7, a flag value indicating which physical quantity was assessed as "inspection required" is stored in the numerical controller 11 as data indicative of "inspection required".

Figure 9:
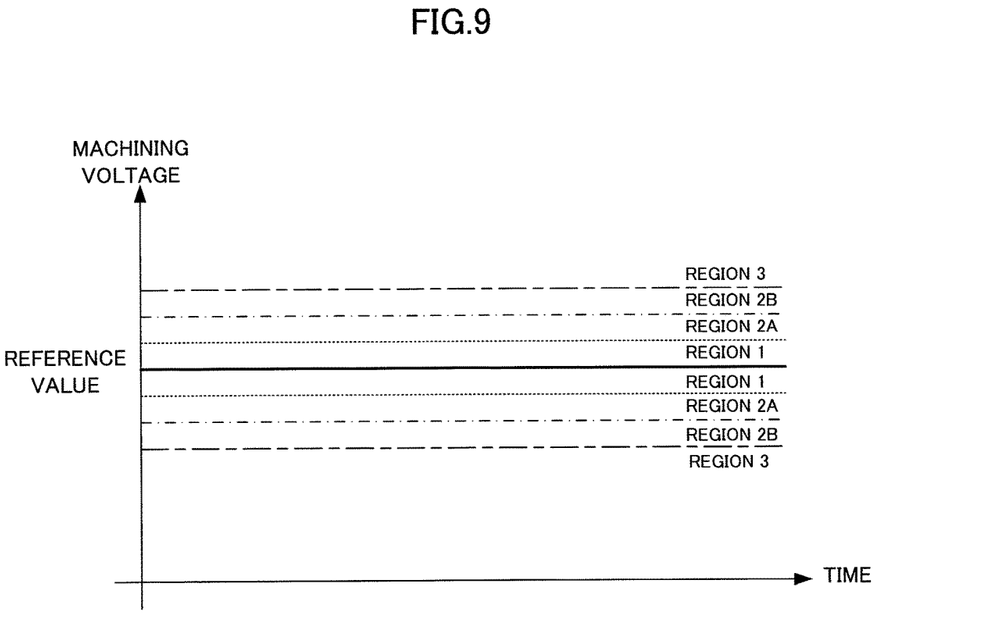
FIG. 9 shows an example of machining voltage values and assessment of machined product quality for a case where multiple "inspection required" ranges are defined for machining voltage assessment.

In the examples shown in FIGS. 3 and 4, monitoring information for machining voltage and machining current is sorted into three ranges, namely "region 1" (with assessment result "non-defective products"), "region 2" (with assessment result "inspection required"), and "region 3" (with assessment result "defective products"). Alternatively, the range of "region 2" (with assessment result "inspection required") may be subdivided into a range of "region 2A" (with assessment result "inspection required 1") and a range of "region 2B" (with assessment result "inspection required 2") as shown in FIG. 9, and different data may be stored in the numerical controller 11 depending on whether the level of "inspection required" is "inspection required 1" or "inspection required 2", such as storing a flag value in the numerical controller 11 when the machining voltage or current falls under region 2A and storing the machining voltage value when the machining voltage or current falls under region 2B.

In the above-described example, the monitoring range is specified by defining a reference value for the machining voltage or current and setting predetermined widths above and below the reference value to establish assessment regions. Instead of setting such a reference value, the monitoring range may be specified by establishing upper and lower limit values.

In the above-described example, when the assessment result is "defective products", the machining voltage and all of other monitoring information including machining current, machining speed, and current positions of axes are stored in the numerical controller 11. It is not necessarily required to store all kinds of monitoring information, however; different data may be stored according to the type of data that falls outside the predetermined range. For example, in a case where monitored data is water temperature, only the time at which the water temperature fell outside its monitoring range may be stored.

Also, in the above-described example, as long as the data stored in the numerical controller 11 does not exceed the storage capacity, the data is sent from the numerical controller 11 to the computer 40 when machining has finished, which is advantageous in that data for the whole machining process can be sent after the machining ends. The invention is not limited thereto however; data may be sent during a machining operation from the numerical controller 11 to the computer 40 through an operator's control or an instruction from a program, or in a case of multiple machining operations for multiple shapes, data may be sent on each performance of a certain number of machining operations for each of the shapes.

The invention claimed is:

1. A data collection system for electric discharge machines, comprising a computer connected with the electric discharge machines over a data transmission path, wherein
information on machining conditions of an electric discharge machine, among the electric discharge machines, is stored in a first storage unit of the electric discharge machine,
information sent from the electric discharge machine after completion of machining is collected by the computer,
the electric discharge machine comprises:
a detection unit that detects a physical quantity relating to machining conditions during machining either at predetermined intervals or each time a moving part of the electric discharge machine has traveled a predetermined distance,
a determination unit that determines whether the physical quantity detected by the detection unit exceeds a predetermined threshold or not,
the first storage unit that
stores the physical quantity or information indicating the fact that the physical quantity exceeds the threshold only when the determination unit determines that the detected physical quantity exceeds the predefined threshold,
but does not store any information when the determination unit determines that the detected physical quantity does not exceed the predefined threshold, and
a transmission unit that sends the physical quantity or the information indicating the fact that the physical quantity exceeds the threshold, stored in the first storage unit, after the machining by the electric discharge machine, and
the computer comprises:
a reception unit that receives the physical quantity or the information indicating the fact that the physical quantity exceeds the threshold sent from the transmission unit after the machining by the electric discharge machine, and
a second storage unit that stores the physical quantity or the information indicating the fact that the physical quantity exceeds the threshold, received by the reception unit.

2. The data collection system for electric discharge machines according to claim 1, wherein the physical quantity includes one of: a machining voltage, a machining current, a machining speed, a temperature of a place where the electric discharge machine is installed, and a water temperature in a machining tank.

3. The data collection system for electric discharge machines according to claim 1, wherein
the threshold is a range defined by an upper limit and a lower limit of the physical quantity, and a plurality of such ranges are set for the physical quantity to be determined by the determination unit,
the electric discharge machine further includes a setting unit that sets one or more items of physical quantities to be stored, from among the physical quantity to be determined by the determination unit and other physical quantities relating to the machining conditions, according to the respective ranges,
the determination unit determines one of the set ranges within which the detected physical quantity falls, and
the first storage unit stores the item of physical quantity, set by the setting unit according to the respective ranges, based on the determination result of the determination unit.

4. The data collection system for electric discharge machines according to claim 1, wherein
the threshold is a range defined by an upper limit and a lower limit of the physical quantity, and a plurality of such ranges are set for the physical quantity to be determined by the determination unit,
the electric discharge machine further includes a setting unit that selects, for each of the set ranges, one of:
a first storage mode that stores the physical quantity in a form of a measured value and
a second storage mode that stores the physical quantity in the form of a flag indicating whether the physical quantity falls within or outside the range,
the determination unit determines one of the set ranges within which the detected physical quantity falls, and
the first storage unit stores the physical quantity in the first or second storage mode selected by the setting unit, based on the determination result of the determination unit.

5. The data collection system for electric discharge machines according to claim 1, wherein when the physical quantity or the information indicating that the physical quantity exceeds the threshold, stored in the first storage unit of the electric discharge machine, exceeds a predetermined size, the physical quantity or the information indicating that the physical quantity exceeds the threshold is sent from the electric discharge machine to the computer, and the machining by the electric discharge machine is stopped.

* * * * *